United States Patent [19]
van Buren et al.

[11] Patent Number: 5,338,444
[45] Date of Patent: Aug. 16, 1994

[54] PROCESS FOR REMOVING MERCURY FROM ORGANIC MEDIA WHICH ALSO CONTAIN ARSENIC

[75] Inventors: Frederik R. van Buren, Terneuzen; Leendert Deij, Axel, both of Netherlands; Gunnar Merz; Hans P. Schneider, both of Stade, Fed. Rep. of Germany

[73] Assignee: The Dow Chemical Company, Midland, Mich.

[21] Appl. No.: 987,911

[22] Filed: Dec. 9, 1992

[51] Int. Cl.$^5$ ............................................. B01D 15/00
[52] U.S. Cl. ..................... 210/660; 210/912; 210/914; 585/822; 585/823; 585/830
[58] Field of Search ............... 210/679, 688, 914, 660, 210/911, 912; 585/822, 823, 830

[56] References Cited

U.S. PATENT DOCUMENTS

| | | | |
|---|---|---|---|
| 4,861,939 | 8/1989 | Debras et al. | 585/820 |
| 4,877,920 | 10/1989 | Lush et al. | 585/823 |
| 4,911,825 | 3/1990 | Roussel et al. | 585/822 |
| 4,933,159 | 6/1990 | Nowack et al. | 423/245.1 |
| 4,950,408 | 8/1990 | Duisters et al. | 210/914 |

FOREIGN PATENT DOCUMENTS

| | | |
|---|---|---|
| 0270675 | 6/1988 | European Pat. Off. |
| 0319615 | 6/1989 | European Pat. Off. |
| 49-98494 | 9/1974 | Japan |

OTHER PUBLICATIONS

Reactive Polymers, 8 (1988) 211–220, Jackson and Vickers, "Sulfur-containing resins from polyepichlorohydrin for mercury adsorption".

Polimery 1985, 30, 439–445, Bogoczek and Kociolek, "Investigation of properties of styrene–divinylbenzene ion exchangers containing methylenethiol groups".

Przemysl Chemiczny, 68/2 (1989), 83–85, Bogoczek et al., "Removal of mercuric ions from waste water".

*Primary Examiner*—Ivars Cintins

[57] ABSTRACT

Process for removing mercury from an organic medium which at least contains mercury and arsenic, wherein the organic medium is contacted with a solid polymeric substrate containing thiol groups bound to the polymeric substrate through aliphatic groups.

8 Claims, 1 Drawing Sheet

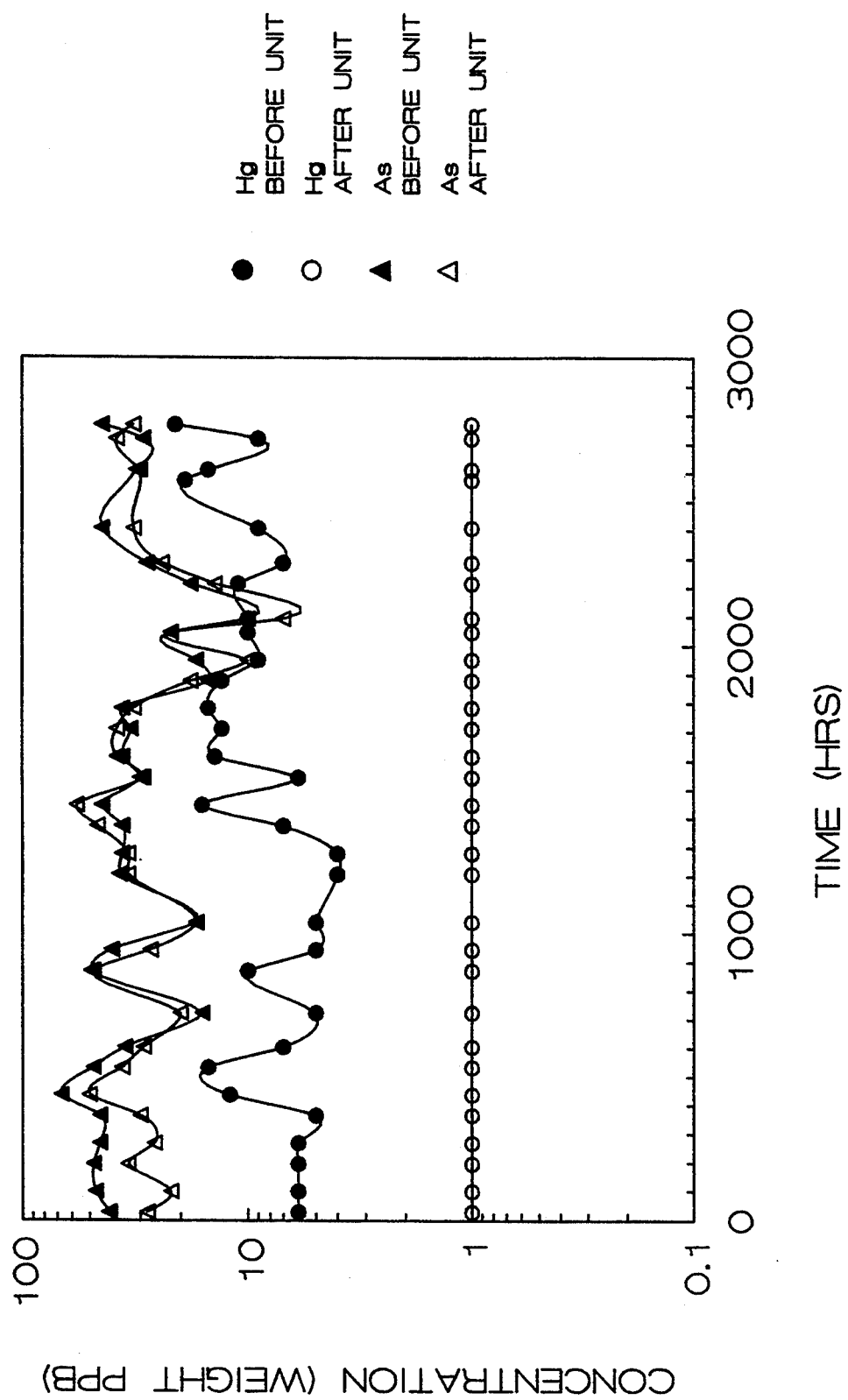

PROCESS FOR REMOVING MERCURY FROM ORGANIC MEDIA WHICH ALSO CONTAIN ARSENIC

CROSS-REFERENCE TO RELATED APPLICATION

This application is a Continuation-in-Part of the copending application Ser. No. PCT/EP91/002376, filed Dec. 9, 1991.

The present invention relates to a process for removing mercury from organic media which also contain arsenic. In another aspect the invention relates to the removal of mercury and arsenic from these organic media.

BACKGROUND OF THE INVENTION

It is known that organic media, such as for example hydrocarbon streams and mixtures derived from naturally occurring oils or gasses or other fossil fuels contain small amounts of contaminants such as mercury, arsenic and lead. Especially liquid hydrocarbon mixtures such as naphtha and natural gas condensates contain both small amounts of mercury and arsenic, as well as other metals such as lead. Typical mercury and arsenic concentrations in such hydrocarbon mixtures range between about 5 and 1,000 ppb. These hydrocarbon mixtures are subjected in chemical and petrochemical plants to cracking processes, such as steam cracking or catalytic cracking, and the products of these cracking processes may be subjected to further catalytic treatments, such as hydrogenation and hydrotreatment processes.

Both mercury and arsenic can cause problems in chemical and petrochemical plants because of their toxicity and catalyst poisoning properties, especially when such catalysts contain metal components like, for example, platinum and palladium which are commonly found in hydrogenation catalysts. Apart from that, mercury can cause corrosion, for example by amalgamation, in processing equipment and especially equipment based on aluminum or its alloys. In view of the corrosive properties of mercury and the potential risk for equipment damage, it is of primary importance to remove mercury from hydrocarbon mixtures containing mercury and arsenic.

EP-A-0319615 describes a method to remove mercury in finely divided or elemental or atomic form from organic media using a solid adsorbent containing active SH-groups.

Long run tests performed by the present inventors to remove mercury from gas condensates containing both mercury and arsenic employing the solid adsorbent used in EP-A-0319615 which contains thiol groups directly attached to an aromatic ring of the polymer backbone, have shown an unsatisfactory mercury removal performance.

At a mercury level of 32 weight ppb and an arsenic level of 80 weight ppb in the feed gas condensate, the known process favored, on the long run, arsenic adsorption over mercury adsorption. The breakthrough point for mercury occurred already at thirty to forty thousand bed volumes. In typical plants such as steam crackers, at complete adsorption of mercury and arsenic, and under typical throughput rates (bed volumes of about 10 m$^3$; liquid hourly space velocity of about 25 hr$^{-1}$), this would mean that the adsorbent bed needs to be replaced and/or regenerated about every two months.

The regeneration of the used adsorbent bed is typically done ex situ as typically the regeneration is done with concentrated HCl which is corrosive and can attack the metal tubing. The frequency of replacement or regeneration could be decreased by using larger adsorption bed volumes, however, this is undesirable as larger beds require higher capital investment, and since distribution problems may occur with respect to the liquid to be treated. The size of the bed is also limited, as the longer the bed is, the larger the pressure drop over the bed, which pressure drop should be limited in order to avoid damaging the bed. Thus there is a need for a process for removing mercury from organic media which also contain arsenic with improved long-term mercury removal performance.

SUMMARY OF THE INVENTION

According to the present invention mercury is removed from an organic medium which contains at least mercury and arsenic, wherein the organic medium is contacted with a solid polymeric substrate containing thiol groups bound to the polymeric substrate through aliphatic groups.

The present process exhibits a high selectivity for removing mercury in the presence of arsenic. The present process does not remove arsenic in substantial amounts. Therefore, the large majority of the adsorption sites of the adsorbent is available for mercury adsorption. The mercury breakthrough point for the adsorbents used in the present process consequently occurs only long after the breakthrough point for arsenic, as opposite to the adsorbents described in EP-A-0319615, and thus the present process offers increased long-term mercury removal capabilities.

BRIEF DESCRIPTION OF THE DRAWING

FIG. 1 illustrates the effect of treatment of natural gas condensate with polymeric substrates, having thiol groups bound through aliphatic groups, on the concentration of mercury and arsenic. Mercury is effectively removed while the concentration of arsenic remains essentially unchanged.

DETAILED DESCRIPTION OF THE INVENTION

The solid polymeric substrate containing thiol groups bound to the polymeric substrate through aliphatic groups will hereinafter also be referred to as "absorbent."

Examples of aliphatic groups bridging the thiol group and the polymer backbone in the adsorbent include linear and branched $C_1$-$C_{10}$ alkylene groups such as e.g. methylene and ethylene; cycloaliphatic groups such as $C_4$-$C_{16}$ cycloalkylenes, for example, cyclopentylenes and cyclohexylenes; as well as hybrids of linear aliphatic and cycloaliphatic groups. The aliphatic groups may be substituted, provided the substituents do not have a significant negative effect on mercury adsorption and selectivity. Preferably the thiol group is bound to the polymeric substrate by a linear aliphatic group and more preferably by methylene.

Without wishing to be bound to any explanation, it is believed that the high selectivity for adsorbing mercury in the presence of arsenic by the polymeric substrate containing thiol groups bound to the polymeric substrate via aliphatic groups is due to the specific electronic environment of the thiol group. Attachment of the thiol group to an aliphatic carbon atom, as in the adsorbents used in the present process, favors mercury adsorption over arsenic adsorption. In case the thiol group is directly attached to an aromatic carbon atom, as in the adsorbents used in EP-A-0319615, the lone electron pairs of the thiol interact with the pi-electrons of the aromatic ring such as to give an electronic environment which favors arsenic adsorption over mercury adsorption. Accordingly, the use of the present adsorbents to remove mercury from organic media, and especially hydrocarbon media which also contain arsenic, has the unexpected result that mercury is removed highly selectively, whereas arsenic is not removed substantially.

The solid polymeric substrate modified with mercapto aliphatic groups may comprise any resin which is compatible with and substantially insoluble in the organic medium. Typically, styrenic type polymers or copolymers and preferably cross-linked polymers or copolymers are used as polymeric substrate. Advantageously, a cross-linked polymer of the macroporous type is used, which may also be referred to as a macroporous ion-exchange type resin. Suitable resins are, for example, copolymers of styrene and a comonomer polymerizable with styrene. As comonomer polymerizable with styrene may be used, for example, divinylbenzene, trivinylbenzene and other multi-ethylenically unsaturated monomers. Copolymers of styrene and divinylbenzene are most preferably employed. The divinylbenzene content of these preferred copolymers typically is in the range of from about 0.1 weight to about 20 weight %, and preferably from about 2 weight to about 15 weight %. Styrene-divinylbenzene copolymers can be prepared according to known methods such as, for example, described in "Ullmann's Encyklop. der tech. Chemie," 4th Ed., Vol. 13, 303.

The adsorbent used in the present process can be prepared according to any suitable method. There are basically two methods: the first one comprises introducing the thiol group or the mercapto aliphatic group to an already prepared polymer backbone; the second one comprises polymerizing or copolymerizing at least one monomer which contains both a polymerizable function as well as a mercapto aliphatic substituent. The first method is preferred.

The adsorbents to be used in the present invention are preferably used in the form of beads having an average particle size in the range of from about 0.1 to about 5 mm.

In the present process the organic medium is preferably a mixture of hydrocarbons, such as obtained from processing naturally occurring oils and gasses or fossil fuels. The process is especially suitable for natural gas condensates. Preferably, the organic medium to be treated contains from about 5, and more preferably from about 20 to about 200 ppb mercury and from about 10 to about 300 ppb arsenic. The present process is found to provide excellent results even in case there is an excess off arsenic present in the medium compared to the amount of mercury.

The temperature at which the present process is carried out depends on the particular medium and is not critical. Typically, the temperature is in the range of about $-20°$ C. to about $80°$ C., and preferably from about $0°$ C. to about $50°$ C.

The pressure at which the process is carried out is not critical. Preferably the pressure is such as to keep the medium to be treated essentially in the liquid phase. Typical pressures are from about 1 to 20 bar. The pressure drop over an adsorbent bed should preferably be not more than 2 bar in order to avoid damage to the bed. Reduction of pressure drop can be achieved by appropriate selection of e.g. the following parameters: bed size; particle size of the adsorbent bed; and flow rate.

The liquid hourly space velocity (LHSV) is normally in the range of from about 1 to 50 $hr^{-1}$, preferably from about 10 to 40 $hr^{-1}$.

The way in which the adsorbent is contacted with the organic medium is not critical. Preferably the adsorbent is used in the form of an adsorption bed, placed within the organic stream to be treated. Advantageously a vertical bed is used and the stream to be treated is passed through the bed in a downflow direction.

The adsorbent used in the present invention preferably does not contain hydrophilic functions, i.e. is preferably hydrophobic so as to be better compatible with the organic medium and especially the hydrocarbon stream to be treated as well as to improve oxidation stability. Compared with the adsorbent material employed in EP-A-0319615, which also contains hydrophilic sulphonic acid groups, the presently used adsorbents are much less sensitive to oxidation.

An additional advantage of the present process is that fewer regenerations of the present adsorbent are needed in view of the longer cycle times. Furthermore, as the method used to remove mercury from the adsorbent does not substantially remove also arsenic, regeneration of the present adsorbents will be easier and less expensive compared to regenerations of the adsorbent employed in EP-A-0319615 in view of the substantial lower quantities of arsenic adsorbed on the present adsorbents.

The adsorbent used in the present invention can be regenerated with mineral acids, such as for example concentrated HCl or with solutions containing mercury complexing agents, such as for example mercapto ethanol, thiourea, or alkaline polysulfide, whereas also mixtures of mineral acids and complexing agents may be used.

According to a further aspect, the present invention relates to a process for removing mercury and arsenic from an organic medium wherein first mercury is removed selectively according to the method of the present invention and subsequently arsenic is removed from the medium by contacting the medium with a solid adsorbent for arsenic.

Any solid adsorbent suitable for removing arsenic from organic media and especially hydrocarbon streams can be used. Examples of suitable solid arsenic adsorbent materials which may be used in the present invention are described in EP-A-0270675, U.S. 4,933,159, U.S. 4,877,920 and U.S. 4,861,939.

The process of the present invention is illustrated by the following examples, without limiting the scope of the invention.

In the examples the mercury content of the organic medium is determined by an extraction with aqueous mercaptoethanol. 50 ml of the medium is shaken with 5 ml of a 0.1 weight % aqueous mercapto ethanol solution for about 1 min. The phases are allowed to separate and the aqueous phase is drained off. The mercury content of the aqueous phase is measured by means of Inductively Coupled Plasma—Atomic Emission Spectroscopy, using 100 and 200 weight ppb standards for calibration. The detection limit of mercury for natural gas condensate is 1 weight ppb.

The arsenic content is determined by the method described in "Dosage de l'arsenic dans les charges de formage catalytique par absorption atomique sans flamme," F. La Villa and F. Queraud, *Revue de l'Institut Francais du Petrole,* May–June 1977, Vol. 32, nr. 3, p. 413–426.

The mercury and arsenic content of the adsorbent materials is determined by the following acid digestion method. About 100 mg of dry resin is weighed into a digestion tube. Then about 5 ml of concentrated sulfuric acid is added. The tube is placed in a digestion block and heated to 180° C. for 1 hr. Then the temperature of the block is raised to 280° C. To promote the digestion concentrated $HNO_3$ is added dropwise. The digestion is continued at 280° C. until a clear solution is obtained. The solution is evaporated to obtain 1 ml of residue. The digestion tube is allowed to cool and the content of the tube is transferred to a 25 ml calibrated flask which is subsequently filled to the mark with deionized water. Final determination of mercury and arsenic contents is done by Inductively Coupled Plasma—Atomic Emission Spectrometry, as mentioned hereinbefore.

All percentages and ppb values in the preceding description and in the following examples are expressed on a weight basis.

SYNTHESIS OF THE ADSORBENT

Under stirring 62.3 g of a macroporous copolymer of styrene and 8 weight % (technical) divinylbenzene was treated with 309.2 g of chloromethyl methyl ether. After 30 minutes 20.0 g of $FeCl_3$ were added. The temperature was kept at 55° C. for 4 hours. The thus chloromethylated copolymer was washed with a dimethoxymethane/methanol mixture, to give a yield of 175 g chloromethylated copolymer (270 ml).

100 ml of the chloromethylated copolymer was swollen in 250 ml tetrahydrofurane for about 45 minutes. Then 35 g thiourea in 100 ml of methanol were added to replace the chlorine on the chloromethylated copolymer by thio isouronium chloride salt. The temperature was kept at 60° C. for 5 hours. The copolymer in salt form was washed thoroughly with water to give 140 ml of the copolymer in thio isouronium chloride salt form.

135 ml of the thus obtained thio isouronium chloride salt of the copolymer was hydrolyzed with a mixture of 135 ml water and 180 ml of 25% sodium hydroxide. While stirring, the temperature was raised to 45° C. After 3 hours the copolymer containing thiol methylene groups thus formed was thoroughly washed with water until a pH of 8–9 was reached. 88 ml of the methylene mercaptane substituted copolymer were obtained.

CHARACTERIZATION OF THE ADSORBENT

The adsorbent resin prepared as described in the previous section and the Rohm & Haas IMAC TMR resin used in EP-A-0319615, which is a hydrophilic macroporous ion exchange resin having a styrene-divinyl benzene copolymer backbone with thiol groups directly attached to the aromatic rings and further containing sulphonic acid groups, were compared for their total mercury capacity and oxidation resistance according to the following methods.

The total mercury capacity was determined by dissolving an excess quantity of about 300 mg of mercuric chloride in 50 ml deionized water. 100 mg of the previously dried resin were added to this solution. The mixture was allowed to stand for at least 24 hours while occasionally shaken. The solid resin was then separated from the solution and the amount of mercury remaining in solution was determined by atomic absorption spectrometry. From this result the amount of mercury adsorbed on the resin was calculated. The total mercury capacity of the adsorbent resin to be used in the process of the present invention was 850 mg mercury per g dry resin, whereas for the comparative IMAC TMR resin the value was 700 mg mercury per g dry resin.

The oxidation stability of both resins in oxygen was determined by means of differential scanning calorimetry using a DuPont DSCII cell coupled to a DuPont 2100 computer system. About 10 mg of the dry resin in an aluminum pan was degassed at 100° C. in $N_2$ during 15 minutes and subsequently subjected in an oxygen atmosphere to a programmed temperature increase from 30° C. to 200° C. at a rate of 10°C./min. The onset of the thermal oxidative degradation for the adsorbent used in the present process occurred at 116.4° C., whereas for the comparative IMAC TMR resin this value was 80.2° C.

The oxidation stability in air was determined by exposing both resins to atmospheric air during a period of one year and determining the total mercury adsorption capacity after that period. The adsorbent used in the present process fully retained its original adsorption capacity of 850 mg mercury per gram dry resin, whereas the adsorption capacity of the comparative IMAC TMR resin decreased from the original value of 700 mg mercury per gram dry resin to less than 100 mg per gram dry resin.

These data show that solid polymeric substrates containing thiol groups bound to the polymeric substrate through aliphatic or cycloaliphatic groups, are much less vulnerable to air oxidation than the resin employed in the prior art method.

EXAMPLE 1

A glass column with an inner diameter of 10 mm and a length of 200 mm was filled with about 12 ml of the adsorbent synthesized as described in the section SYNTHESIS OF THE ADSORBENTS, having an average particle size of 0.6 mm. The resin was washed with 2-propanol before use. A natural gas condensate containing 32 weight ppb mercury and about 80 weight ppb arsenic was pumped through the column with a liquid hourly space velocity of 25 $h^{-1}$. The mercury concentration in the column effluent was measured to be less than 1 weight ppb at 50,000 bed volumes; less than 1 weight ppb at 100,000 bed volumes; 5 weight ppb at 150,000 bed volumes; and 4 weight ppb at 220,000 bed volumes, at which time the experiment was stopped. The weight ratio between mercury and arsenic as adsorbed on the resin was determined to be about 5:1.

Comparative Example 1

A glass column with an inner diameter of 10 mm and a length of 200 mm was filled with about 12 ml of Rohm & Haas IMAC TMR resin. The resin was washed with 2-propanol before use. Natural gas condensate containing 32 weight ppb mercury and about 80 weight ppb arsenic was pumped through the column with a liquid hourly space velocity of 25 $hr^{-1}$. The mercury concentration in the column effluent was less than 1 weight ppb after 20,000 bed volumes, 1.5 weight ppb at 30,000 bed volumes and 7 weight ppb at 33,500 bed volumes. The experiment was stopped then as the steep increase in mercury concentration demonstrated breakthrough of the adsorption bed.

EXAMPLE 2

An adsorption unit was filled with 90 liter of an adsorbent as described in Example 1. Through this adsorption unit a natural gas condensate containing about 10 weight ppb mercury and about 40 weight ppb arsenic was pumped in a downflow arrangement. The liquid hourly space velocity during the first 1200 hours of the test was maintained at 15 hr$^{-1}$. During the next 1300 hours, the liquid hourly space velocity was maintained at 22.5 hr$^{-1}$. Finally, during the subsequent 400 hours the liquid hourly space velocity was maintained at 30 hr$^{-1}$.

The results of this experiment are shown in FIG. 1, where the mercury and arsenic concentrations in the natural gas condensate, both before and after passing the adsorption unit, are given as a function of run time. Throughout the duration of the test, the mercury is removed from the natural gas condensate to a value below the detection limit of 1 weight ppb, whereas the arsenic is substantially not removed. During the test run, the pressure drop over the adsorption bed remained below 2 bar.

What is claimed is:

1. A process for removing mercury from an organic medium which at least contains mercury and arsenic which comprises contacting the organic medium with a solid polymeric substrate containing thiol groups bound to the polymeric substrate through aliphatic groups.

2. Process according to claim 1 wherein the thiol group is bound to the polymeric substrate via a methylene group.

3. Process according to the claim 1 wherein the solid polymeric substrate is a macroporous ion exchange resin.

4. Process according to claim 3 wherein the macroporous ion exchange resin is a polymer of styrene or a copolymer of styrene and a comonomer polymerizable with styrene.

5. Process according to claim 4 wherein the macroporous ion exchange resin is a copolymer of styrene and divinylbenzene.

6. Process according to claim 1 wherein the organic medium comprises a mixture of hydrocarbons.

7. Process according to claim 6 wherein the hydrocarbon mixture comprises a natural gas condensate.

8. A process for removing mercury and arsenic from an organic medium which comprises first contacting the organic medium with a solid polymeric substrate containing thiol groups bound to the polymeric substrate through aliphatic groups to selectively remove mercury, and subsequently contacting the medium with a solid absorbent to remove arsenic.

* * * * *